US008424648B2

(12) United States Patent
Wilson et al.

(10) Patent No.: US 8,424,648 B2
(45) Date of Patent: Apr. 23, 2013

(54) POSITIONAL SETTING TOOL FOR USE IN AN OIL SUMP LUBRICATION SYSTEM

(75) Inventors: Jay Wilson, Helenville, WI (US); Lewis Beck, Clemson, SC (US)

(73) Assignee: Trico Corporation, Pewaukee, WI (US)

( * ) Notice: Subject to any disclaimer, the term of this patent is extended or adjusted under 35 U.S.C. 154(b) by 106 days.

(21) Appl. No.: 12/924,449

(22) Filed: Sep. 28, 2010

(65) Prior Publication Data

US 2011/0147127 A1    Jun. 23, 2011

Related U.S. Application Data

(63) Continuation-in-part of application No. 11/891,989, filed on Aug. 14, 2007, now Pat. No. 7,845,813.

(51) Int. Cl.
*F16N 29/00* (2006.01)
*G01C 9/00* (2006.01)

(52) U.S. Cl.
USPC ............................................. 184/7.4; 33/286

(58) Field of Classification Search .................... 184/7.4; 33/263, 286
See application file for complete search history.

(56) References Cited

U.S. PATENT DOCUMENTS

| | | | | |
|---|---|---|---|---|
| 1,734,293 A * | 11/1929 | Hellweg | ........................ | 118/234 |
| 3,015,371 A * | 1/1962 | Gits | ............................ | 184/103.2 |
| 3,590,857 A * | 7/1971 | Gruett | ............................ | 137/414 |
| 3,605,086 A * | 9/1971 | Triska | ........................ | 340/450.3 |
| 4,895,222 A * | 1/1990 | Hoffmann | ................... | 184/103.1 |
| 4,907,881 A * | 3/1990 | Jones | ........................ | 356/139.05 |
| 7,146,739 B2 * | 12/2006 | Ku et al. | ........................ | 33/286 |
| 7,306,525 B2 * | 12/2007 | Sawada | ........................ | 473/212 |
| 7,377,045 B2 * | 5/2008 | Burry et al. | ..................... | 33/286 |
| 2006/0016083 A1 * | 1/2006 | Huang | ............................ | 33/286 |

OTHER PUBLICATIONS

USPTO Office Action dated Feb. 22, 2010 regarding U.S. Appl. No. 11/891,989, 13 pages.
Article; Glass, LS, or SS Opto-Matic Oilers, date unknown, 1 page.
Article; Simple Device for Measuring Trico Oiler Crossbar Height, date unknown, 1 page.

* cited by examiner

*Primary Examiner* — Michael Mansen
*Assistant Examiner* — Mark K Buse
(74) *Attorney, Agent, or Firm* — Ryan Kromholz & Manion, S.C.

(57) ABSTRACT

A tool for use in a lubrication system having an oil-containing sump for supplying lubricating oil to a mechanical device and an oiler device connected to the sump for delivering a supply of oil to the sump, the oiler device comprising a base for supporting an oil reservoir and an adjustable element movably disposed within the base for predetermining a level of oil to be maintained within the sump. The tool has a first portion configured to extend into the base for engagement with the adjustable element and a second portion disposed exteriorly of the base to visually indicate the disposition of the adjustable element relative to the oil-containing sump, preferably in the form of a pointing device, optimally a laser beam generating instrument, for representing the disposition of the adjustable element.

1 Claim, 9 Drawing Sheets

POSITIONAL SETTING TOOL FOR USE IN AN OIL SUMP LUBRICATION SYSTEM

RELATED APPLICATION

This is a continuation-in-part application of Ser. No. 11/891,989, filed on Aug. 14, 2007 now U.S. Pat. No. 7,845,813.

BACKGROUND OF THE INVENTION

The present invention relates generally to systems and devices for lubricating mechanical equipment and, more particularly, to devices used for setting and maintaining a supply of lubricating oil to a sump associated with the mechanical equipment being lubricated.

The use of an oil sump to provide a supply of lubricating oil is a common means of lubrication selected by machine designers to lubricate various types of industrial equipment, such as pumps, blowers, gear boxes, drives and compressors. The provision of an oil sump offers the advantages of a simple and low-cost design which, if properly attended, can be operated with commensurately low maintenance costs and low risk of component failure.

A critical requirement to the efficacy of an oil sump is the proper maintenance of the oil level in the sump. Depending on the item of equipment to which the sump provides lubrication, it may be necessary that the oil level be maintained within a relatively narrow range to assure sufficient lubrication without overfilling of the sump. Generally speaking, the smaller the sump and attendant quantity of the oil supplied in the sump, the more narrow will be the range of acceptable oil levels.

It is widely recognized that oil in a sump or any other enclosed lubrication system will be gradually lost due to leakage and other factors, thereby necessitating some means for replenishing the oil supply at least periodically. In oil lubricating systems, the most common means of maintaining a generally constant lubricant level in the sump is to attach a so-called constant level oiler device to the sump to provide a continuously available excess quantity of oil fed gravitationally through the oiler into the sump as its oil level depletes. Various types of constant level oilers are known in the industry, including both adjustable and non-adjustable types. The present invention relates specifically to adjustable-type constant level oilers.

Basically, adjustable constant level oilers provide an enclosed reservoir which contains a quantity of oil for delivery, as needed, to the associated sump. The reservoir rests on an adjustable element within a supporting base connected to the sump. Adjusting of the element supporting the reservoir varies the elevation of the reservoir relative to the sump and thereby varies the gravitational flow of the oil to the sump to, in turn, determine the equilibrium level of oil maintained in the sump. Hence, the careful setting of the position of the adjusting element in the initial setup of the constant level oiler is critical to maintaining a proper desirable level of oil within the sump.

While this lubrication system utilizing a constant level oiler to supply an oil sump is simple in design and operation, it has been discovered through an empirical sampling that a surprising proportion of constant level oilers in actual operation are improperly set so as to maintain either too high or too low of an oil level within the associated pump. In either case, the end result is that the associated mechanical component will generate excessive heat, causing early degradation of the oil supply and shortening the life of the mechanical device.

While various factors may contribute to inaccurate settings of constant level oilers, one significant problem is believed to be the necessity with conventional oilers that the adjustable element be set manually through a trial and error process. The adjustable element resides within a base which supports the oiler, whereby its elevational position within the oiler base can only be set visually from a downward view into the base, which impairs the ability of a technician to carefully sight the level of the adjustable element in relation to the associated sump. Hence, one manufacturer's installation instructions provide for the initial setting of the adjustable element, placement of the oil reservoir and operation of the equipment to check the actual prevailing lubrication level in the sump, followed by repeating the process one or more times if the oil level in the sump is too high or too low.

A need accordingly exists within the relevant industry for an improved means of setting up a constant level oiler which would be simplified and easier to accomplish than conventional set-up techniques yet would also provide greater precision and reliability to the setting of the desired oil level.

SUMMARY OF THE INVENTION

The present invention proposes to satisfy this recognized need basically by providing a unique tool by which the positional setting of the adjustable element within the base of the constant level oiler is indicated visually from the exterior of the—constant level oiler for more precise adjustment relative to the associated oil sump.

More specifically, the tool of the present invention provides a first portion configured to extend into the base of the constant level oiler and into engagement with the adjustable element, and a second portion disposed exteriorly of the base and including a pointing device to visually indicate the disposition of the adjustable element relative to the oil-containing sump. Thus, as the elevation of the adjustable element of the oiler is moved upwardly and downwardly during the set-up process, the pointing device of the present tool provides a visual reference at each step in the adjustment process to sight the position of the adjustable element relative to the oil sump from exteriorly of the oiler, thereby greatly improving the ability of the technician to more precisely set the position of the adjustable element.

In a preferred embodiment, the pointing device on the second portion of the tool is most optimally in the form of a laser beam generating instrument, to represent most precisely the disposition of the adjustable element. It is contemplated to be desirable that a marking be made or provided on the exterior of the sump precisely at the most desirable elevation of the oil level therein. In turn, the laser beam or other pointing device points toward or shines against the sump as the position of the adjustable element is calibrated, thereby to ensure the most precise positioning of the element in relation to the sump.

It is further preferred that the first and second portions of the tool be rigidly fixed with respect to one another. For example, the tool may be configured as a unitary body in an inverted V-shape having a first depending leg forming the first portion, a second depending leg generally parallel to the first leg forming the second portion, and a bridge portion connecting the first and second legs in spaced parallel relation. In use, therefore, the tool is fitted onto the base of the oiler with the first leg extending downwardly alongside an interior side of the base into engagement with the adjustable element, with the second leg extending downwardly alongside an exterior side of the base, and with the bridge portion disposed across an upwardly facing edge of the base. A positioning element such as an adjusting screw may be threadedly supported on the bridge portion of the tool for adjusting the elevational disposition of the tool relative to the base so as to position the first depending leg of the tool in contact with the adjustable element without placing unnecessary weight or force against the element.

In other embodiments of the invention, a plurality of additional or alternate positioning means are provided on a leveling tool to ensure that the elevational disposition of the tool is capable of precise setting so that the laser is true, with means of adjusting the x, y and z axes of the tool to allow for proper and consistent lubricant supply to the sump.

DESCRIPTION OF THE PREFERRED EMBODIMENT

Figure 1:
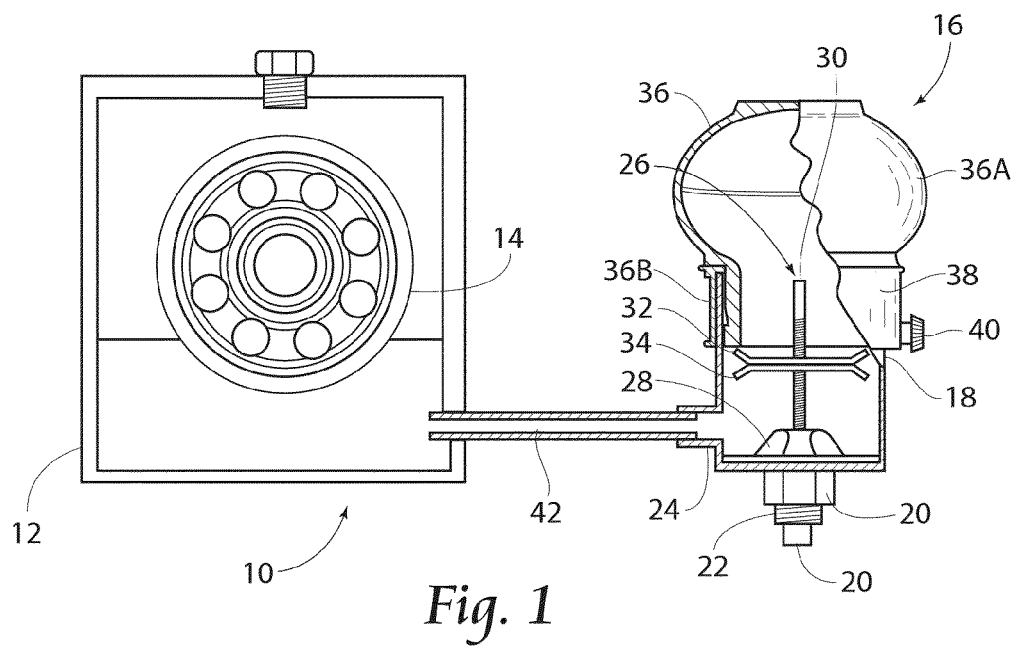
FIG. 1 is a schematic view, partly in side elevation and partly in vertical cross-section, depicting a conventional lubrication system having a constant level oiler for controlling the oil level in an associated mechanical oil sump for a mechanical device depicted only representatively as a bearing shaft.

With reference now to the accompanying drawings and initially to FIG. 1, a conventional oil sump lubrication system, indicated generally in its totality at 10, is shown schematically in partial side elevation and partial vertical cross-section. The lubrication system 10 basically comprises an oil-containing sump 12, indicated only representatively, which partially contains a quantity of lubricating oil and also in which is disposed a mechanical device partially submerged within the quantity of contained oil for lubrication. The mechanical device is indicated for illustrative purposes as a simplified form of ball bearing assembly 14, but as those persons skilled in the art will recognize, the mechanical device could be a pump, blower, gearbox, drive, compressor or any other form of mechanical component requiring lubrication. In turn, the configuration of the sump would be designed in relation to the mechanical device and, hence, it is to be understood that the depiction of the arrangement of the sump and the mechanical device are merely schematic for purposes of illustrating the environment relevant to the present invention.

The lubrication system 10 further includes a constant level oiler device, generally indicated at 16, which is connected to the sump 12 to provide a replenishing supply of oil to the sump as the quantity of oil.

For purposes of illustration and description of the present invention, the constant level oiler device 16 is shown as being an "Opto-Matic" model of constant level oiler manufactured by Trico Manufacturing Corp., of Pewaukee, Wis., although it is to be understood that the present invention is not limited to use with this particular model or manufacturer of constant level oiler, but instead has a broader and more generalized application for use with other forms of adjustable-type constant level oilers.

The constant level oiler device 16 basically comprises a hollow cupshaped base 18 open at its upper end and formed with threaded ports 22, 24 at its bottom end and on one side surface for selective connection to an oil delivery conduit 42. The base 18 contains an oil level adjustment assembly 26 having a foot portion 28 supporting an upright threaded bolt 30 extending centrally through the base 18. Upper and lower adjuster arms 32, 34, each in the form generally of a wing-type nut, are threadedly supported on the upright bolt 30 for rotational movement upwardly and downwardly therealong for purposes more fully described hereinafter.

The constant level oiler device 16 further includes an oil reservoir 36 having a generally spherical globe 36A merging downwardly into a generally cylindrical collar 36B. The oil reservoir 36 is hollow and opens downwardly through the lower rim of the collar 36B, which rests on the upwardly facing surface of the uppermost adjuster arm 32.

A cylindrical skirt 38 annularly surrounds the collar portion 36B of the oil reservoir 36 at a slight annular spacing therefrom and is sealed to the oil reservoir 36 adjacent the juncture between the globe 36A and the collar 36B. In this manner, the assembly of the oil reservoir 36 and the skirt 38 may be situated on the base 18 with the collar portion 36B extending interiorly within the base 18 into resting engagement on the upper adjuster arm 32 and with the skirt 38 outwardly encircling the base 18. The skirt 38 may be equipped with a set screw 40 to secure the oil reservoir assembly in place rigidly relative to the base 18.

In operation, the base 18 is connected via either of the ports 22, 24 to an appropriate pipe or conduit, indicated only schematically at 42, which in turn is connected to an oil entrance port formed in the sump 12. The port 22 or 24 of the base 18 which is not actively connected to the conduit 42 is closed via a threaded plug. FIG. 1 depicts merely for illustrative purposes a so-called side-mounted connection between the constant level oiler device 16 and the sump 12, wherein the side port 24 of the oiler device 16 is connected laterally with a similar side port in the sump 12, but those persons skilled in the art will also recognize that a so-called bottom-mounted connection between the bottom port 22 of the oiler device 16 and a bottom port in the sump 12 may be utilized.

In basic set-up for operation, the oil reservoir 36 is initially filled with oil and inverted into assembly, as above-described, onto the base 18, whereby the oil gravitationally fills the base 18, the collar portion 36B and a portion of the globe portion 36A of the oil reservoir 36. The elevation of the upper adjuster arm 32 determines the elevation of the oil reservoir 36 and, in turn, determines the equilibrium level to which the oil fills the bottom of the sump 12. Thus, prior to set-up, the upper adjuster arm 32 is threadedly moved manually along the upstanding bolt 30 into a disposition at an elevation as close as possible to the desired level of oil within the sump 12. The lower adjuster arm 34 is threadedly moved along the bolt upwardly into abutment with the underside of the upper adjuster arm 32 as a means of locking the upper adjuster arm 32 in its adjusted disposition.

One of the difficulties in this conventional set-up procedure is the inability of the technician to accurately set the elevation of the upper adjuster arm 32 in relation to the desired oil level within the sump 12, because of the inability of the technician to view the interior of the sump 12 and also to view laterally the interior of the base 18 of the constant level oiler device 16. It is conventional to place a marking on the exterior housing surface of the sump 12 visually indicating the desired interior oil level to be maintained within the sump 12, and the technician is able to view downwardly into the interior of the base 18 of the constant level oiler device 16, but it is difficult for the technician to accurately sight laterally or horizontally the elevation of the adjuster arm 32 against the exterior level marking on the sump 12. Hence, as noted above, Trico Manufacturing Corporation, the maker of the "Opto-Matic" model oiler device recommends the trial-and-error procedure discussed above in initially setting up the oiler and also each time the oiler must subsequently be refilled with a supply of oil. Unfortunately, however, technicians do not always properly follow this procedure and, moreover, it still remains difficult to precisely set the elevation of the upper adjuster arm 32.

Figure 2:
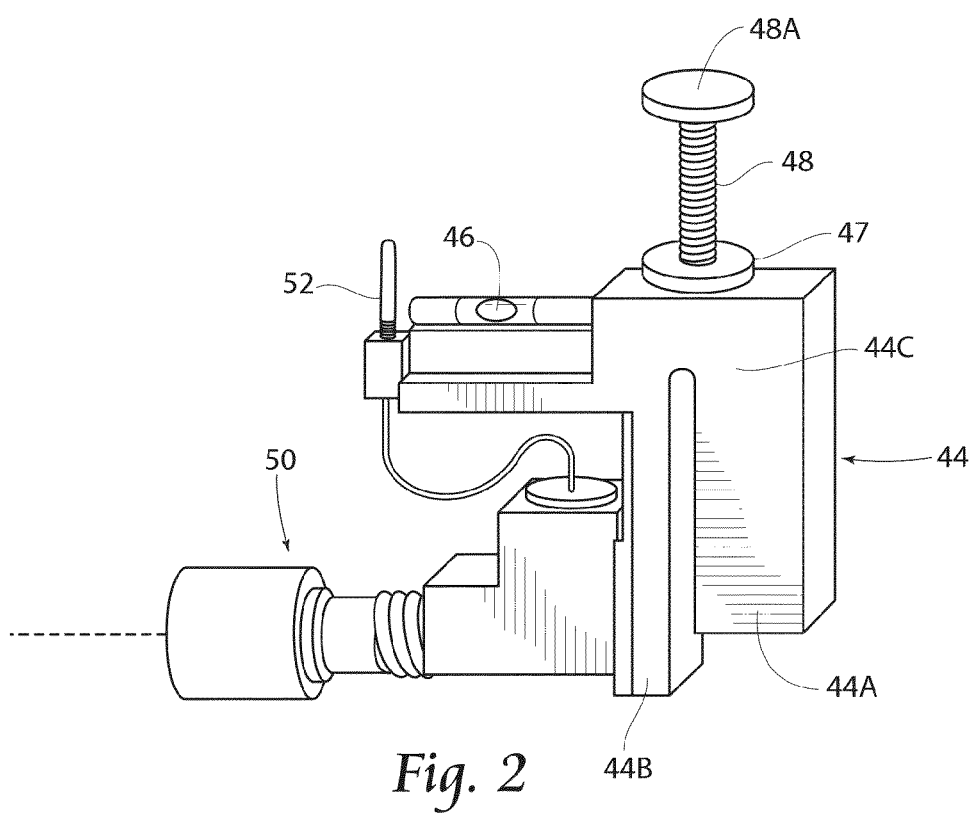
FIG. 2 is a perspective view depicting a preferred embodiment of the tool of the present invention.
Figure 3:
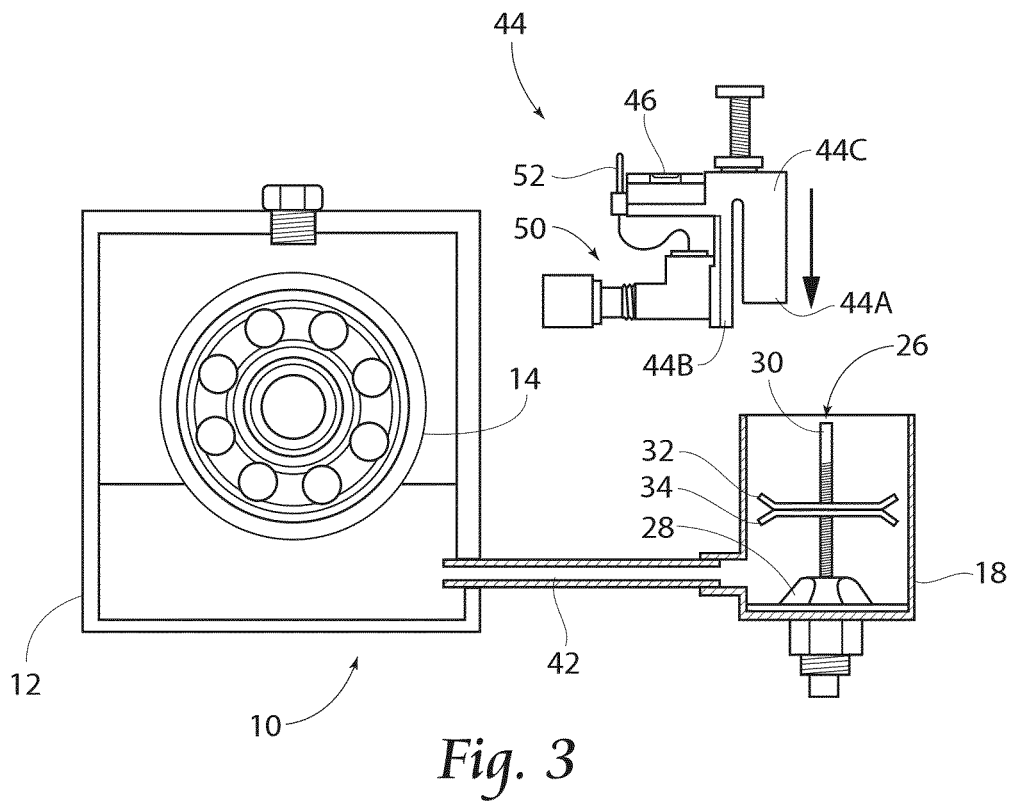
FIGS. 3 and 4 are views of the lubrication system of FIG. 1, but depicting sequential steps in the use of the present tool for setting the oil level within the sump via adjustment of the adjusting element of the constant level oiler.
Figure 4:
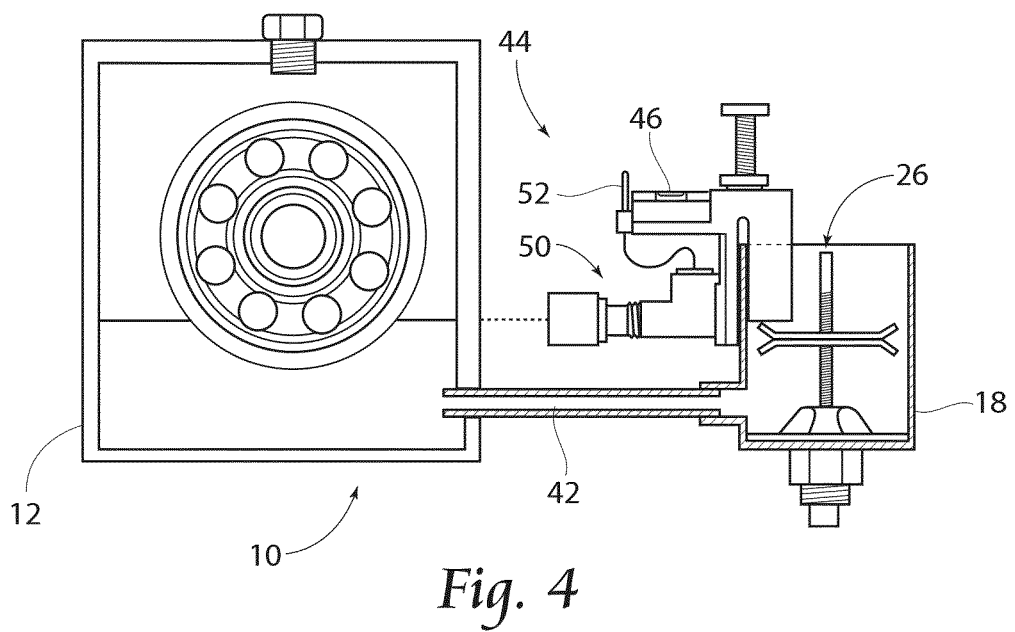

Accordingly, the present invention provides a novel position setting tool, as indicated generally at 44 in FIG. 2. Basically, the tool 44 is configured to be used during set-up of the constant level oiler device 16, when the assembly of the oil reservoir 36 and the skirt 38 have been removed from the base 18, as depicted in FIGS. 3 and 4. The tool 44 may be of differing configurations, but fundamentally is configured to be placed about the upper rim of the base 18 with one portion of the tool 44 extending interiorly within the base 18 into engagement with the upper adjuster arm 32 and with another portion of the tool 44 situated exteriorly of the base 18 at precisely the same elevation as the interior portion engages the adjuster arm 32, thereby to visually provide a precise reference to the elevation of the adjuster arm 32 to enable the technician to accurately sight in relation to the exterior marking on the sump 12.

In FIG. 2, a preferred embodiment of the tool 44 is depicted as being a unitary body formed in an inverted U-shaped configuration with two parallel leg portions 44A, 44B, depending from a connecting bridge portion 44C. In this manner, the tool 44 may be disposed on the rim of the base 18 with the leg portion 44A extending downwardly into the interior of the base 18 and the leg portion 44 extending downwardly alongside the exterior of the base 18, with the bridge portion 44C overlying the upper rim of the base 18.

An adjusting screw 48 extends downwardly through the bridge portion 44C in parallel relation to the inner and outer legs 44A, 44B, such that the lower end of the adjusting screw 48 rests in direct contact with the upper rim of the base 18. The adjusting screw 48 includes a thumbwheel portion 48A is integral with the opposite upper end of the adjusting screw 48 for adjustably extending or withdrawing the adjusting screw into or out of the spacing between the inner and outer legs 44A, 44B, thereby to enable the elevation of the tool 44 relative to the base 18 to be adjusted and also to assist in stabilizing the resting disposition of the tool 44 once its elevation is adjusted. By extension and withdrawal of the adjusting screw 48 via the thumbwheel 48A, the tool is rested on the base 18 at precisely the elevation at which the inner leg 44A contacts the upper adjuster arm 32. In turn, the outer leg 44B of the tool 44 provides an external visual reference to the elevation of the upper adjuster arm 32 within the interior of the base 18, e.g., by the formation of the lower edge of the outer leg 44B to be disposed at precisely the same elevation at the exterior of the base 18 as the inner leg 44A or the outer leg 44B may carry a visual reference marking at precisely such elevation. The tool 44 may be provided with a leveling means, such as a bubble type level device 46, to insure that the inner and outer legs are correctly oriented vertically. A lock nut 47 may be provided on the shaft of the adjusting screw 48 to secure the adjusting screw in place once its disposition has been precisely set, thereby to assure that the elevation and level of the tool is maintained.

Optimally, the tool 44 may be equipped with some form of pointing device at the lower end of the outer leg 44B as a supplementary visual reference to the technician. In the preferred embodiment illustrated, a laser beam generating instrument, shown only schematically at 50, may be utilized as a pointing device on the outer leg 44B so as to be shone directly horizontally against the exterior of the sump 12, thereby to provide the most precise visual indication when the adjuster arm 32 and, in turn, the tool 44 is adjusted to precisely the same elevation as the desired level of oil within the sump 12. The tool 44 may have a switch, such as represented at 52, to enable selective actuation and deactuation of the laser beam instrument or other pointing device 50 when needed as a sighting reference. However, it is to be understood that the provision of such a pointing device is not a necessary element of the present tool, as the outer leg 44B itself provides a reliable visual reference to sight against the marking on the exterior of the sump 12.

The advantages of the present positioning tool will be readily apparent to those persons skilled in the art. Utilizing the present tool 44, it will not longer be necessary for any technician to perform any repetitive trial-and-error process in setting up the constant level oiler device 16. Instead, the tool 44 will enable technicians to make a precise setting of the elevation of the upper adjuster arm 32 before the oil reservoir 36 is filled with oil and inverted onto the base 18, without concern for having to repeat the process to ensure the proper oil level is achieved within the sump. Minimal or no skill or experience is needed on the part of the technician to perform a proper set-up of the constant level oiler 16. Further, the overall time required for set-up will be significantly shortened. Most importantly, however, the more reliable maintenance of proper oil levels for lubricating the associated mechanical device will optimize the useful life of the device as well as the useful life of the lubricating oil.

Figure 5:
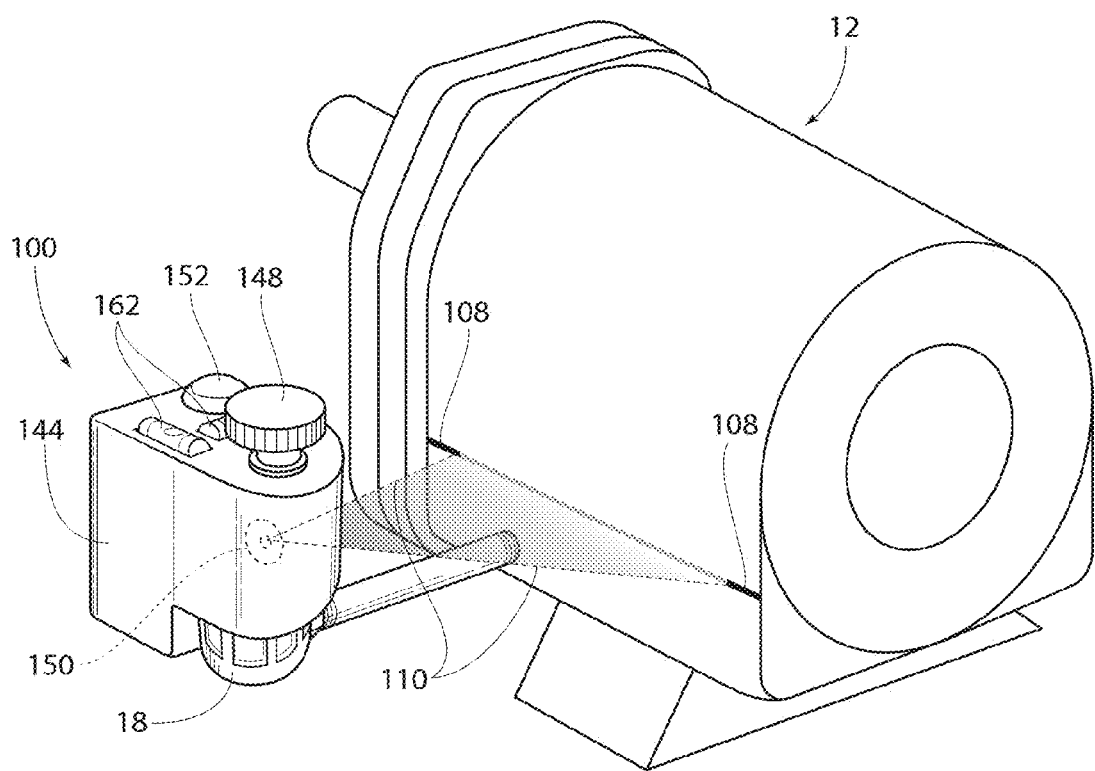
FIG. 5 is a perspective view of an alternate embodiment of a leveling tool of the present invention, deployed on an associated mechanical oil sump, and a generated line being reflected onto a preferred lubricant level contained in the oil sump.

Referring now to FIG. 5, a perspective view of an alternate embodiment of a leveling tool 100 of the present invention is shown, deployed on an associated mechanical oil sump 12. A generated line 110 is shown being reflected onto a preferred lubricant level contained in the oil sump 12, which is pre-designated by markers 108 pre-placed on the oil sump 12. As with the embodiment of FIGS. 2-4, the leveling tool 100 is deployed on the base 18 of the constant level oiler device 16, and later removed so that the constant level oiler device 16 can be replaced on the base 18 in a leveled state.

Figure 6:
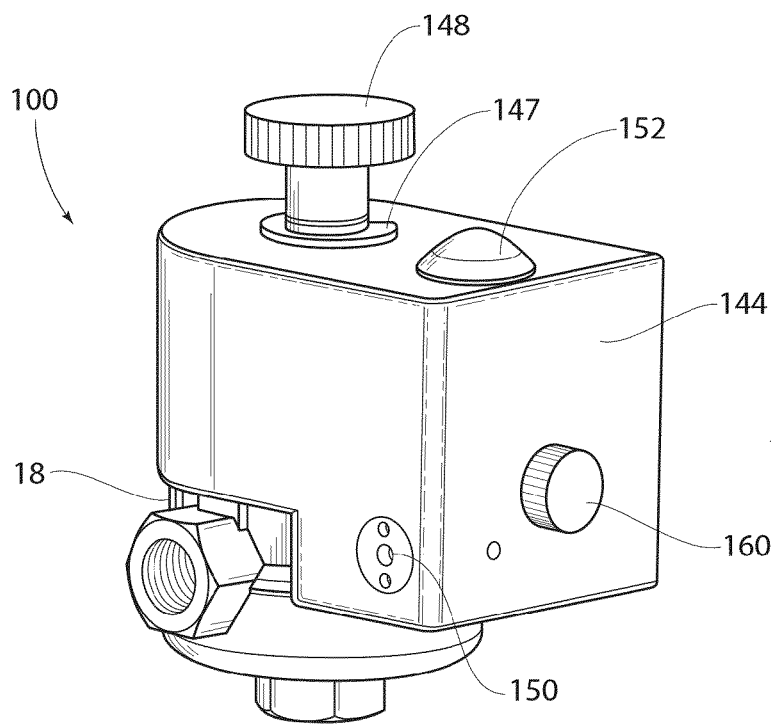
FIG. 6 is a front perspective view of an alternate embodiment of a leveling tool of the present invention.

Referring now to FIG. 6, a front perspective view of leveling tool 100 is shown. An adjuster assembly 148, held by retaining clip 147 against the housing 144, is provided to move the leveling tool 100 up and down on an associated adjusting arm assembly (reference numeral 170 carrying upper adjuster arm 32, FIG. 9) as will be described later. A power button 152 is provided to power on and off line generator 150 (preferably a laser). A fine level adjuster 160 is provided to operate against the base or opto casting 18, again for fine tuning the leveling tool 100.

In use, the adjusting arm assembly 170, upper and lower adjuster arms 32, 34 and shaft 30 are removed from the base 18, and the tool 100 is placed atop the base, to level the top of the base 18 first. Next, the adjuster arms 32, 34 and shaft 30 are replaced in the base 18.

Figure 7:
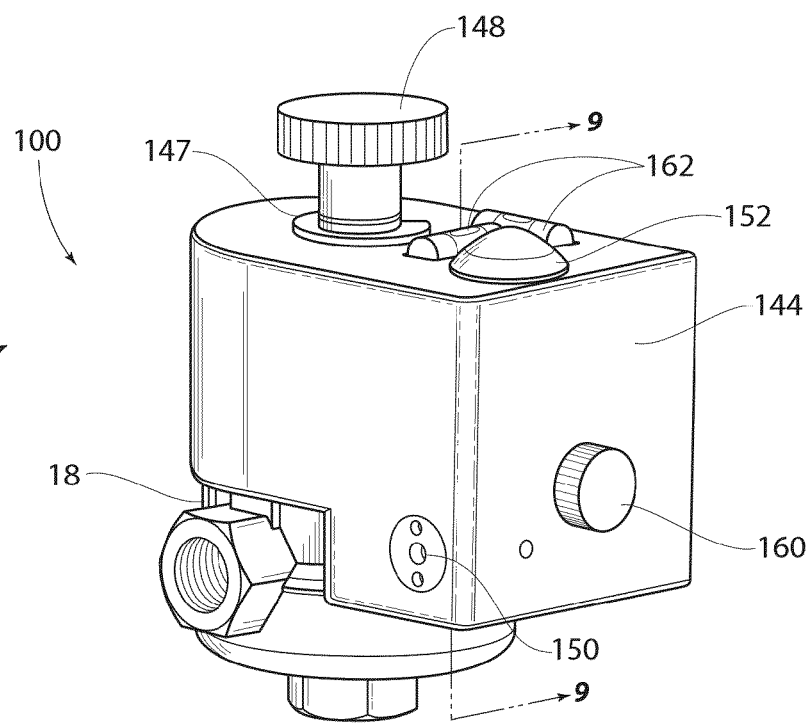
FIG. 7 is a rear perspective view of the alternate embodiment of a leveling tool of the present invention shown in FIG. 6.

In the embodiment shown on FIG. 7, a pair of bubble levels 162 are provided to visually indicate whether the tool 100 is on plane, so that a plane is defined by the bubble levels 162, and the line 110 generated on the casing 12 (see FIG. 5).

Figure 8:
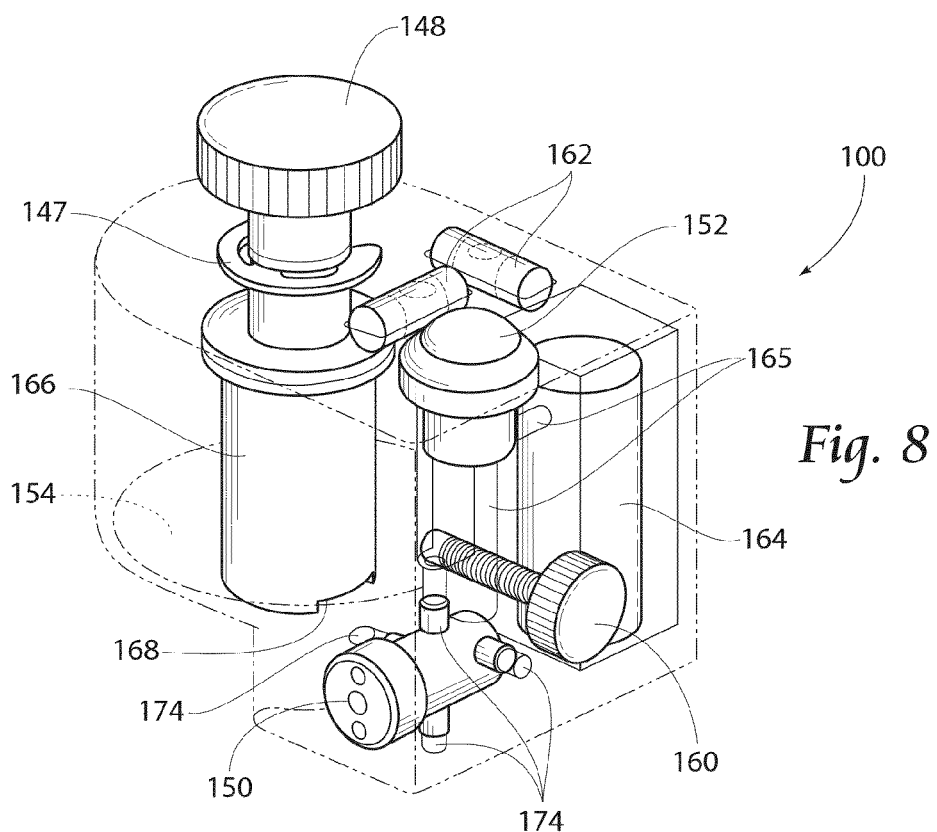
FIG. 8 is a perspective view, with portions broken away, of an alternate embodiment of a leveling tool of the present invention.

Referring now to FIG. 8 a perspective view, with portions broken away, of leveling tool 100 is shown. As can be seen, a void space 154 is provided to circumferentially couple with the base or opto casting 18 (see fitting on FIG. 9). A shaft 166, provided with a channel 168 is provided, which when coupled with an associated portion of the adjusting arm assembly 170 (FIG. 9), namely the upper adjuster arm 32, rotates the upper adjuster arm 32 on a screw like shaft portion of the adjusting arm assembly 170 for adjusting the leveling tool 100 up and down. When the upper adjuster arm 32 is at the desired level, with the top portion of the upper adjuster arm 32 being level with the reference marks 108, as indicated by the generated line 110 (generated at the same level as the top portion of the upper adjuster arm 32), lower adjuster arm 34 can be tightened upwards to hold the upper adjuster arm 32 in place.

As can be seen, power button 152 is operatively connected with the line generator 150 through channels 165, which carry wires (not shown) to transmit the power command to a battery (not shown) carried in battery compartment 164, to the line generator 150. A series of set screws 174 are provided to adjust the x-y axis of the line generator 150, so that the laser generated line is true with the leveling tool 100, so that it generates a true line consistent with the top upper adjuster arm 32.

Figure 9:
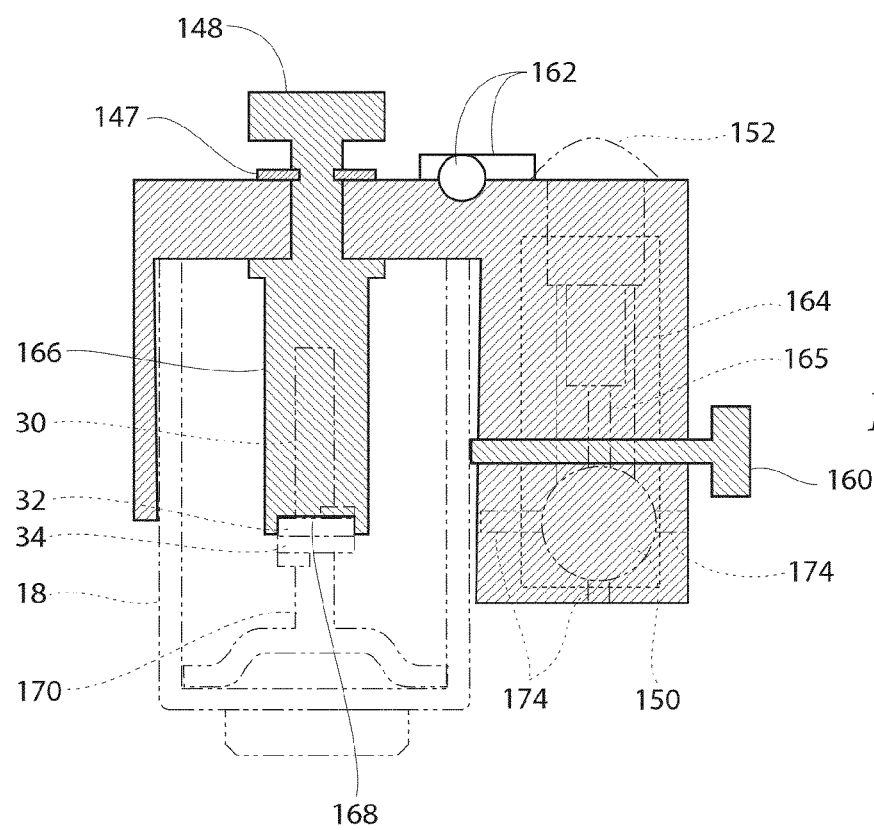
FIG. 9 is a side cross sectional view, with portions broken away, of an alternate embodiment of a leveling tool of the present invention.

Referring to FIG. 9, a cross sectional view, with portions broken away, of leveling tool 100 of the present invention is shown. As can be seen, the fine level adjuster 160, preferably a screw type device with an external manual portion for turning the screw in and out is provided. The fine level adjuster 160 is capable of deflecting the preferably flexible sidewalls of the opto casting 18, should the plane of the top of the leveling tool 100 or housing 144 require adjustment.

Figure 10:
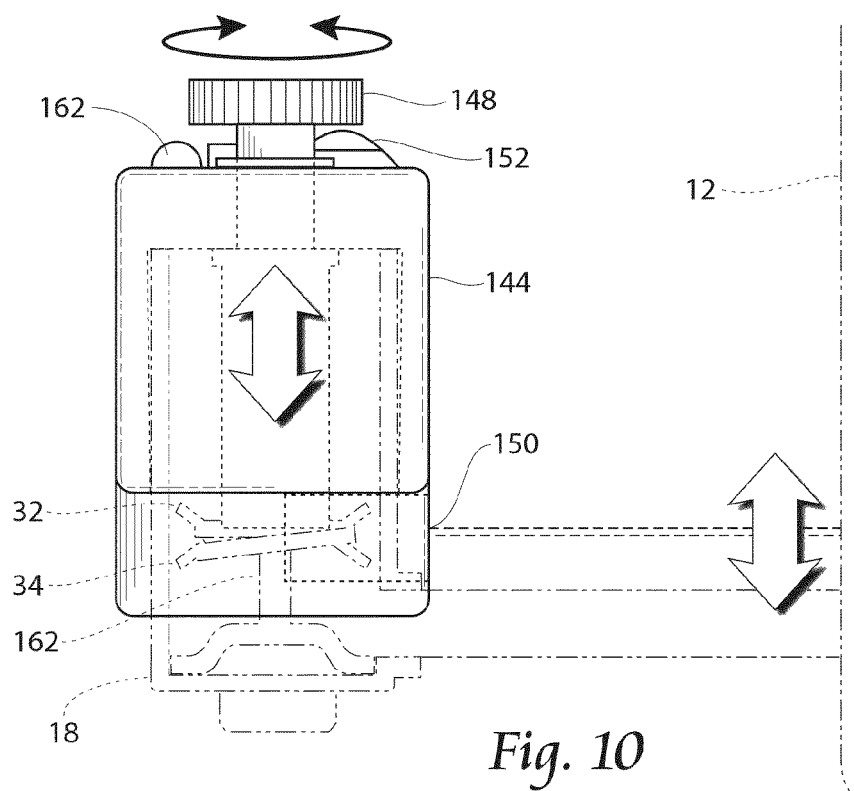
FIG. 10 is a schematic side elevation view, with portions broken away, of an alternate embodiment of a leveling tool of the present invention.
Figure 11:
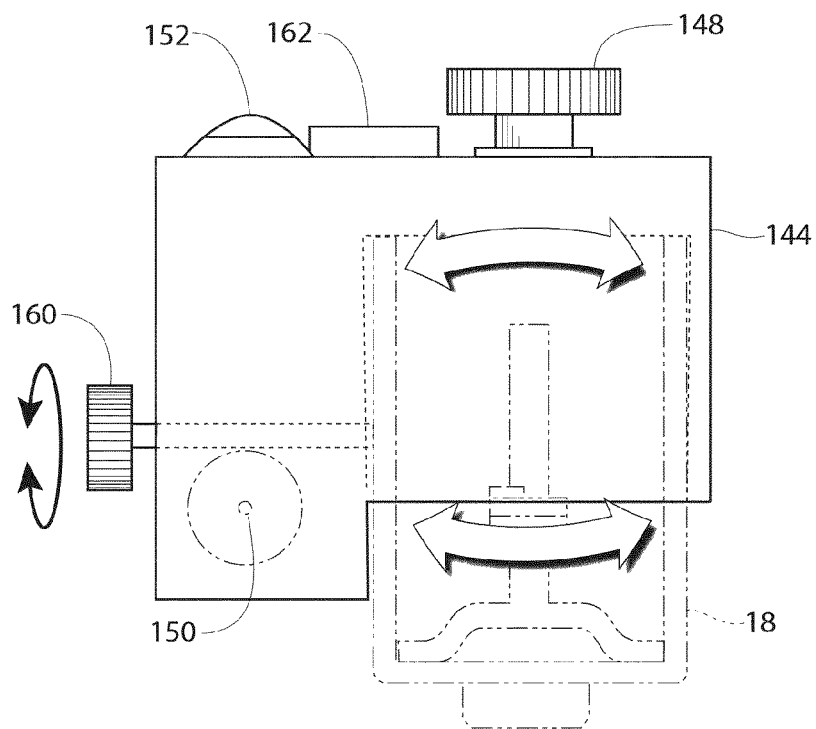
FIG. 11 is a schematic side elevation view, with portions broken away, of an alternate embodiment of a leveling tool of the present invention.

The top surface of the interior 154 of the housing 144 rests atop the top of the sidewall of the opto casting 18. In this sense, the void space 154 of the housing 144 is circumferentially carried by the base or opto casting 18 in order to provide a true planar line generated by the line generator 150, representative of the opto casting 18, which will ultimately hold the constant level oiler device 16 on the leveled base 18 in a leveled state. Vertical adjustment is provided by rotation of the adjuster assembly 148 in cooperation with the screw type adjusting arm assembly assembly 170 (FIG. 10), and in particular adjustment of the upper adjuster arm 32. Horizontal adjustment is provided by rotation of the fine level adjuster 160 (FIG. 11), which deflects the sidewalls of the casing 18. After verifying that the bubble levels 162 indicate horizontal level in the x and y directions, and that the line 110 is level with the markers 108 pre-placed on the oil sump 12, level is accomplished. Next, upper and lower adjuster arms 32, 34, each in the form generally of a wing-type nut, can be threadedly replaced on the upright bolt 162 of the adjusting arm assembly 170, and the constant level oiler device 16 can be replaced in a level state.

Example 2

Figure 12A:
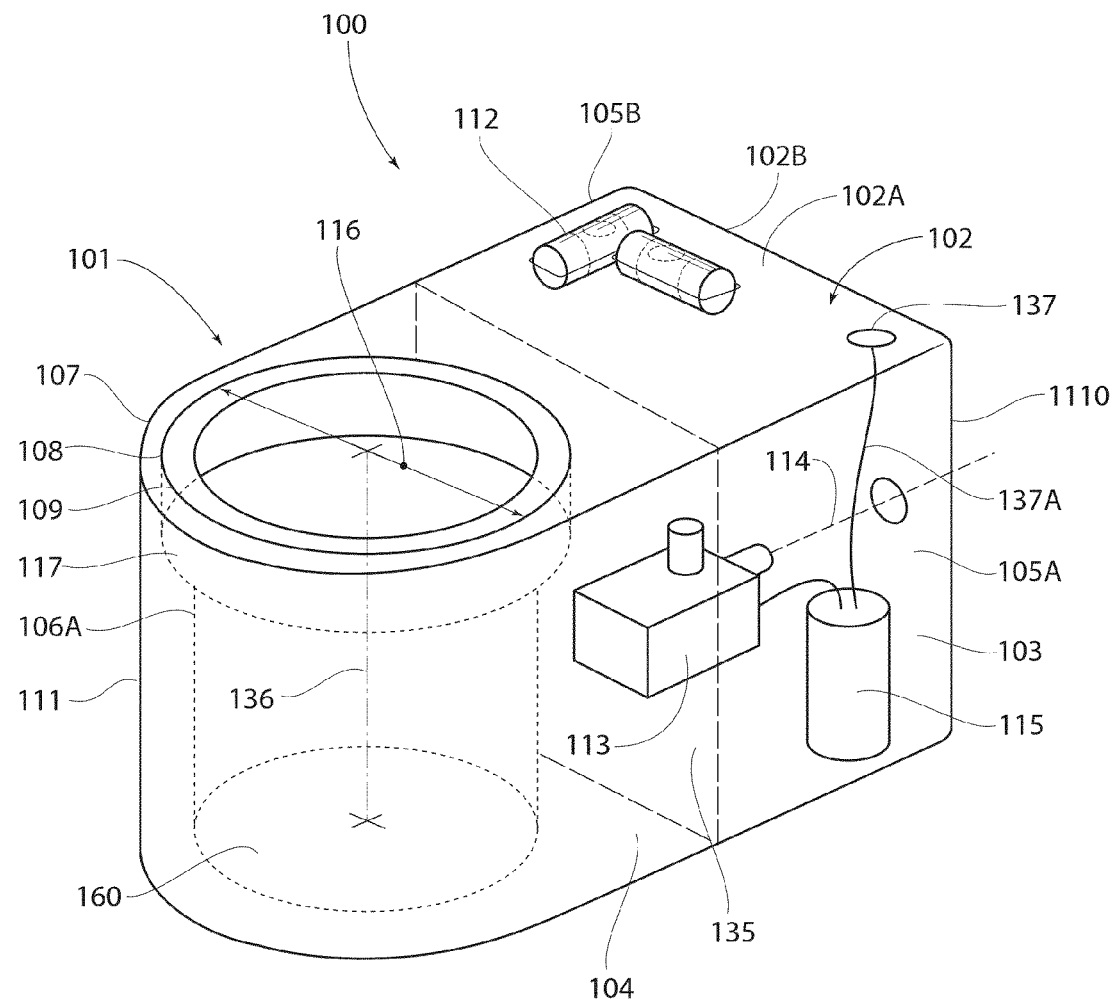
FIGS. 12A-12C are perspective views of a leveling tool of the present invention.
Figure 12B:
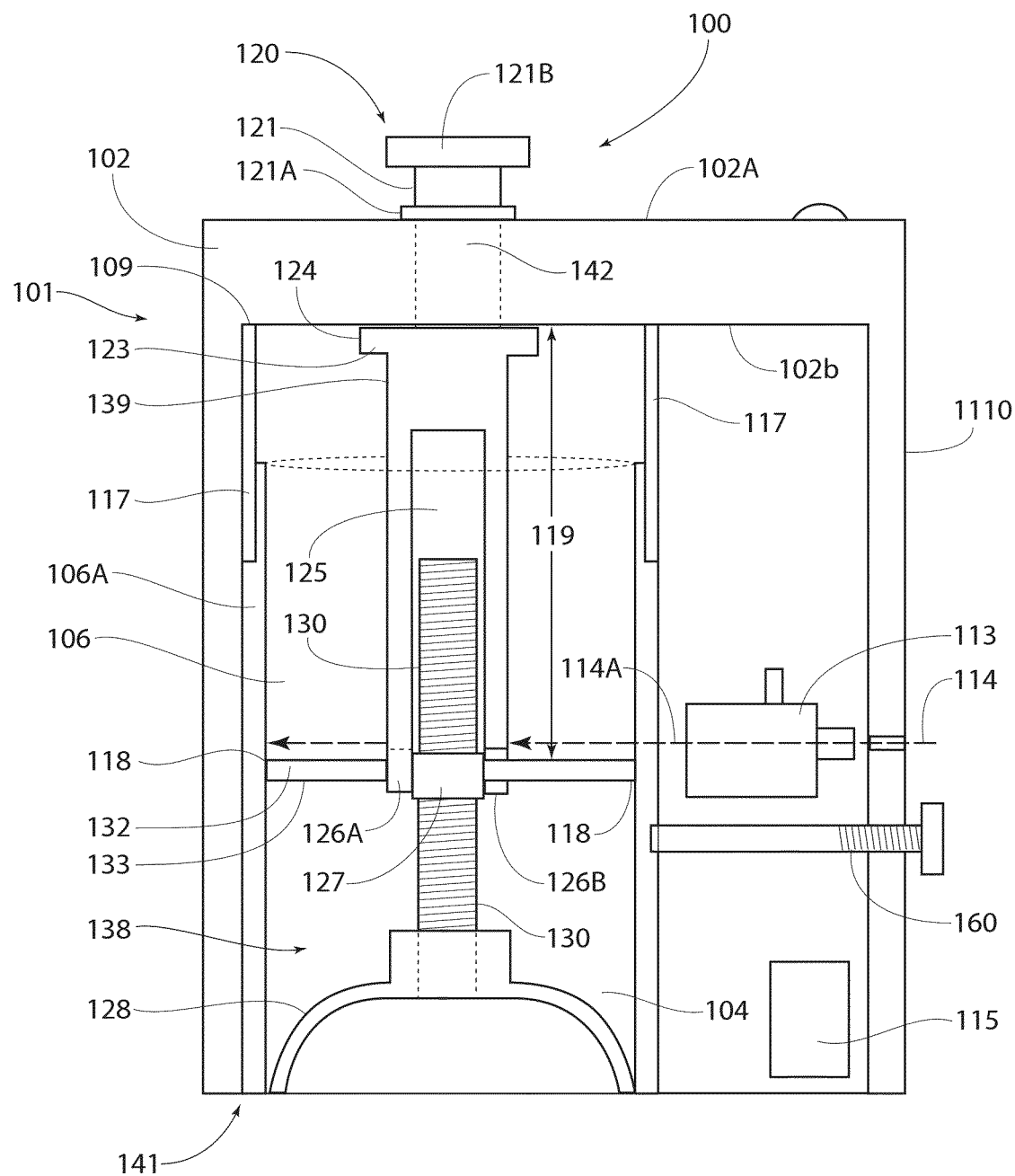
Figure 12C:
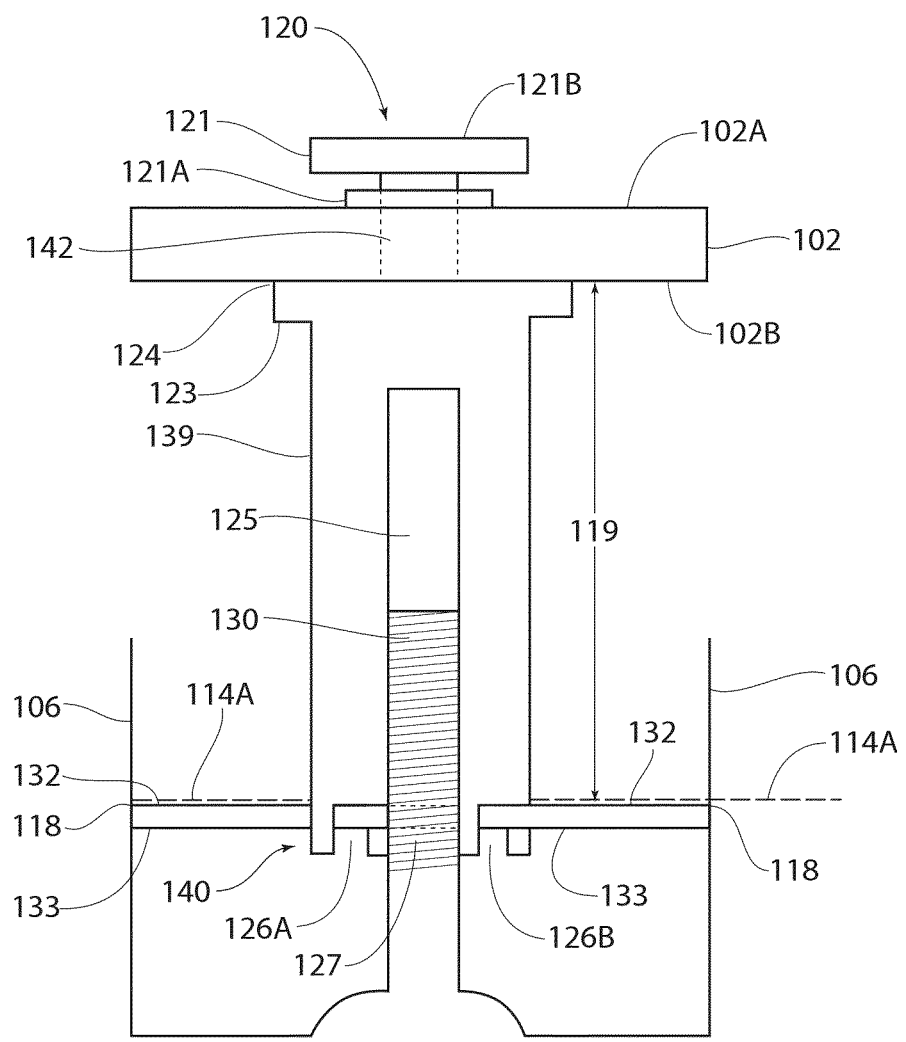

A new positional setting tool is described with references to FIGS. 12A, 12B, and 12C. The tool 100 comprises a housing 101 with a top 102, a first side wall 105A and a second side wall 105B, a first end wall 1100 and second end wall 111. The top has an outer surface 102A and an inner surface 102B. In addition, the housing 101 is partitioned into two chambers or sections: an accessory chamber 103 and a cup chamber 104. As illustrated in FIG. 12A, the second end wall is curved and connected to both the first and second side walls 105A and 105B, respectively. In practice both the first and second side walls could be flat (or curved). A partition or interior wall 135 may structurally separate the accessory chamber 103 and the cup chamber 104.

Two bubble level devices 112 are positioned at right angles to each other on the outer surface of the top 101 at a point above the accessory chamber 103. A beam generator 113, preferably a laser beam generator, is positioned in the accessory chamber such that the generated beam 114 is projected from the first end wall 1100. Note, one skilled in the art recognizes that the beam generator may be positioned to originate/project the beam from any wall without changing or extending the scope or intent of the invention. In addition, a power pack (battery) 115 is also positioned in the accessory chamber 103 and wired 137A through an on/off switch 137 to the beam generator 113 and positioned on the outer surface 102A of the top 102 convenient to both the beam generator 113 and power pack 115.

A cylindrical collar 117 is positioned in the cup chamber 104 and the upper surface perimeter of the cylindrical collar 108 is connected to the inner surface 102B of the top 102 with the body of the cylindrical collar 117 extending vertically downward into the cup chamber 104. The collar perimeter 108 is centered at the top point of the central axis of the perimeter 108 of cylindrical collar 117. The inner diameter of the collar 116 is nominally equal to the oiler cup element 106. The cylindrical collar 117 serves to orient, position, and align the oiler cup 106 which is not part of the invention as previously described in FIG. 1. The oiler cup walls 106A extend vertically upward from the base plate 141 and is engaged around its outer perimeter 109 by the cylindrical collar 117.

One skilled in the art recognizes that a variety of modifications may be made to the structure of the cylindrical collar 117 without expanding or modifying the scope or intent of the invention. These include, but are not limited to using 3-4 segments of the collar as the descending collar rather than the full cylindrical piece and at least three and preferably 6 to 8 pins through the top 102 around the perimeter of the collar that descend downward and serve the function of the cylindrical part 117. These and similar modifications are anticipated by the invention without inclusion in any figure.

FIG. 12B illustrates a cut away, side view of the housing 101 with the oiler cup 106 positioned in the cup chamber 104 aligned on the center axis 136 (FIG. 12A). The oiler cup 106 and the adjustable arm element 138 comprising the base 128, threaded vertical shaft 130, and the upper 132 and lower 133 adjuster arms, including the threaded adjustable arm connector base 127, are part 10 of a standard constant flow oiler device, or comparable, similar device known to those skilled in the art. They are not part of the invention, but understanding the arrangement of the parts, their structure and relationships and with respect to the structures and elements of the invention is essential to an understanding and appreciation of the invention.

An adjustment assembly 120 extends above the upper surface 102A of the top 102 of the housing 101 and traverses the top 102 of the housing 101, extending downward, into the cup chamber 104, and contacting and engaging the upper adjustment arm 132. The adjustable assembly 120 comprises an upper, rotating shaft 121 with a cap 121B attached to its proximal end, and a locking clip 121A that circumscribes the rotating shaft 121 and restrains it from moving vertically through the top 102, but does not impede the free rotation of the rotating shaft as it is positioned traversing the top 102 in the shaft rotation chase 142. The upper rotating shaft is contiguous with the rotating elevator shaft 139. At its uppermost end, the rotating elevator shaft 139 has a flange 123 that is adapted to insure firm contact with the inner surface 102B of the top. Note, the retaining clip 121A secures the rotating shaft in its vertical orientation and maintains the interface contact 124 between the flange 123 and inner surface 102B of the top 102, without restricting rotation of the rotating shaft 121 and as a result, rotation of the elevator shaft 139. The rotating elevator shaft comprises a chase 125 adapted to position and support the threaded shaft 130 in its vertical orientation and alignment.

At its distal end 140 (FIG. 12C) 140 the rotating elevator shaft has a pair of opposing adjuster arm connectors 126A and 126B each member of the pair is adapted to engage the upper adjustable arm 132 simultaneously, such that rotation of the rotating elevator shaft is transferred to the upper adjustment arm 132 from the upper adjustment arm directly to the adjustment connector base 127 to which the adjustment arms 132 and 133 are connected. The threaded shaft 130 is secured to the adjuster arm base 128; thus, rotation of the adjustment connector base causes it to move vertically on the threaded shaft. The adjustment arms are engaged such that upward movement of the adjustment arms causes identical upward movement of the tool housing 101.

When the top of the first adjuster arm 132 contacts the bottom edge of the first and second adjustable arm connectors 126A and 126B, respectively, the adjustable arm base 127 rotates in response to rotation of the cap 121B of the upper rotation shaft 121. rotation upward moves the adjuster arm connector base upward and in response the upper adjuster arm exerts upward force on the first adjuster arm and through it on the first and second adjustment arm connectors thereby transferring the upward force to the interface 124 and the shaft flange 123, resulting in the entire housing being elevated in relation to the threaded shaft.

With the rotating elevator shaft 139 positioned as described with respect to engagement with the upper arm adjuster 132 engaged by the first and second adjustment arm connectors 126A and 126B a fixed vertical distance 119 is established between contact points 118 on the upper adjuster arm and the inner surface 102B of the top 102B at the flange interface 124. The contact points 118 are the precise points at which the oil reservoir element of the oiler device (FIG. 1) rests in relation to the oil cup to deliver the prescribed flow of lubricant to the sump; the same points are the exact fixed elevation of the line-of-sight 114A of center line of the generated beam; thus when the beam from the level tool is properly pointed at the target point on the sump (FIG. 1) the upper adjuster arm must be at the proper level to position the globe to deliver the desired flow of oil to the sump. The lower adjustment arm is rotated upward to lock the upper arm in the desired vertical position.

Functionally, the first and second adjuster arms 132 and 133 are positioned lower than the desired point level. Rotating the elevator lifts the adjuster arm by rotating the adjuster arm connector base 127, but because the flange 123 is not in contact 5 with the inner surface 102B of the top 102, the tool does not move. Subsequent rotation moves the housing (hence the beam source upward, but the distance 119 remains fixed and the appropriate vertical position for the oil reservoir determined by projecting the beam of the pre-established target on the sump.

FIG. 12C provides a more detailed view of the rotating elevator shaft 139 and engagement of the upper adjuster arm 132 by the first 126A and second 126B adjustment arm connectors and the relation of the threaded shaft 130 and the arm connector base 127 as well as the critical distance 119 between the interface of the flange 123 with the inner surface 102B of the top 102 and the reference points 118 on the upper adjustment arm.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention.

The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A positional setting tool comprising:
a housing wherein said housing comprises a top, wherein said top comprises an outer surface and an inner surface, and further, wherein said housing further comprises a first end wall and a second end wall, a first side wall and a second side wall, and a base plate, and further wherein said housing comprises an accessory chamber and a cup chamber, wherein said accessory chamber comprises a beam generator positioned to project through said first end wall a beam on a pre-established target wherein said target is external to said tool, and further wherein said accessory chamber further comprises a power source functionally connected to said beam generator through a switch, wherein said switch is positioned on the outer surface of said top of said housing, and still further wherein said housing further comprises a pair of level devices positioned at right angles the one to the other on the outer surface of said top; an upper rotating shaft wherein said upper rotating shaft traverses said top vertically along a central axis line, and further wherein said rotating shaft rotates freely in a shaft rotation chase that traverses said top of said housing, and said rotating shaft further comprises a retaining clip functionally connected to said rotating shaft and in contact with said outer surface of said top; said rotating shaft further comprises a rotating elevator shaft, wherein said rotating elevator shaft is structurally contiguous with said rotating shaft, and further wherein said rotating elevator shaft comprises a flange element that contacts the inner surface of the top of said housing; said rotating elevator shaft further comprises a distal end wherein said distal end of said rotating elevator shaft comprises a first and a second adjuster arm connector wherein each of said first and second adjuster arm connectors is adapted to rotationally engage an upper adjuster arm, and further an adjustable assembly comprises a critical length defined as a vertical distance between the top edge of said engaged upper adjuster arm and the interface of said flange wherein said vertical distance is the same as the vertical distance between the contact points of said upper adjuster arm and said inner surface of said top, and further wherein said adjustable assembly comprises a level, horizontal line-of-sight from said contact point extending to and through the center of the field of vision of said beam generated by said beam generating device; and said positional setting tool further comprises a fine level adjuster, wherein said level adjuster traverses said first end wall of said housing and contacts the wall of said cup positioned in said cup chamber.

* * * * *